US007864630B2

(12) United States Patent
Chiu et al.

(10) Patent No.: US 7,864,630 B2
(45) Date of Patent: Jan. 4, 2011

(54) METHOD AND APPARATUS FOR MINIMIZING INTERFERENCE BETWEEN SEISMIC SYSTEMS

(75) Inventors: Stephen K. Chiu, Katy, TX (US); Joel D. Brewer, Houston, TX (US); Peter M. Eick, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/933,522

(22) Filed: Nov. 1, 2007

(65) Prior Publication Data

US 2009/0116337 A1    May 7, 2009

(51) Int. Cl.
*G01V 1/00* (2006.01)
(52) U.S. Cl. ...................................................... 367/38
(58) Field of Classification Search ................. 367/189, 367/190, 41; 181/106, 108, 111, 113
See application file for complete search history.

(56) References Cited

U.S. PATENT DOCUMENTS

| | | | | |
|---|---|---|---|---|
| 3,885,225 A * | 5/1975 | Anstey et al. | ................. | 367/41 |
| 4,159,463 A | 6/1979 | Silverman | | |
| 4,707,812 A * | 11/1987 | Martinez | ..................... | 367/46 |
| 4,715,020 A | 12/1987 | Landrum, Jr. | | |
| 4,953,657 A * | 9/1990 | Edington | .................... | 181/111 |
| 4,982,374 A * | 1/1991 | Edington et al. | .............. | 367/48 |
| 5,719,821 A * | 2/1998 | Sallas et al. | .................... | 367/41 |
| 5,721,710 A | 2/1998 | Sallas et al. | | |
| 5,822,269 A | 10/1998 | Allen | | |
| 6,418,079 B1 * | 7/2002 | Fleure | ........................ | 367/40 |
| 6,545,944 B2 | 4/2003 | de Kok | | |
| 7,050,356 B2 * | 5/2006 | Jeffryes | ....................... | 367/41 |
| 2005/0128874 A1 * | 6/2005 | Herkenhoff et al. | ........... | 367/56 |
| 2006/0164916 A1 * | 7/2006 | Krohn et al. | ................... | 367/41 |

OTHER PUBLICATIONS

"Slip-Sweep Acquisition," H. Justus Rozemond, Petroleum Development Oman, Muscat, the Sultanate of Oman, ACQ 3.2, Published 1996, pp. 64-67.

* cited by examiner

*Primary Examiner*—Jack Keith
*Assistant Examiner*—Krystine Breier

(57) ABSTRACT

A method and apparatus for minimizing interference between seismic systems. The method may generally include: (a) actuating a plurality of first sources associated with a first seismic system to generate a first plurality of phase-encoded vibratory signals; (b) actuating a plurality of second sources associated with a second seismic system to generate a second plurality of phase-encoded vibratory signals that are at least partially frequency separated from the first plurality of phase-encoded vibratory signals generated in (a); and (c) detecting the first and second plurality of phase-encoded vibratory signals utilizing a first receiver positioned at a location remote from the first and second sources.

15 Claims, 12 Drawing Sheets

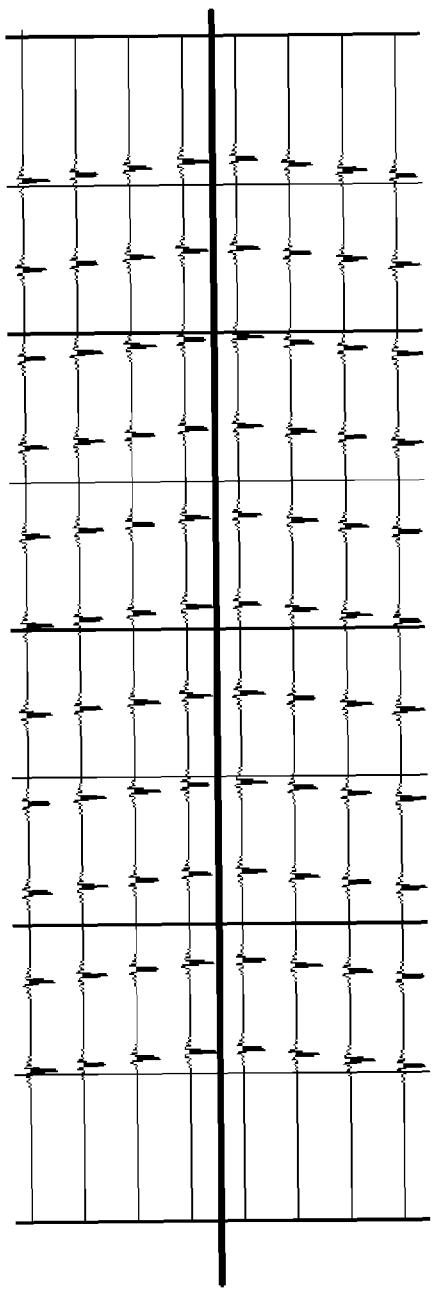 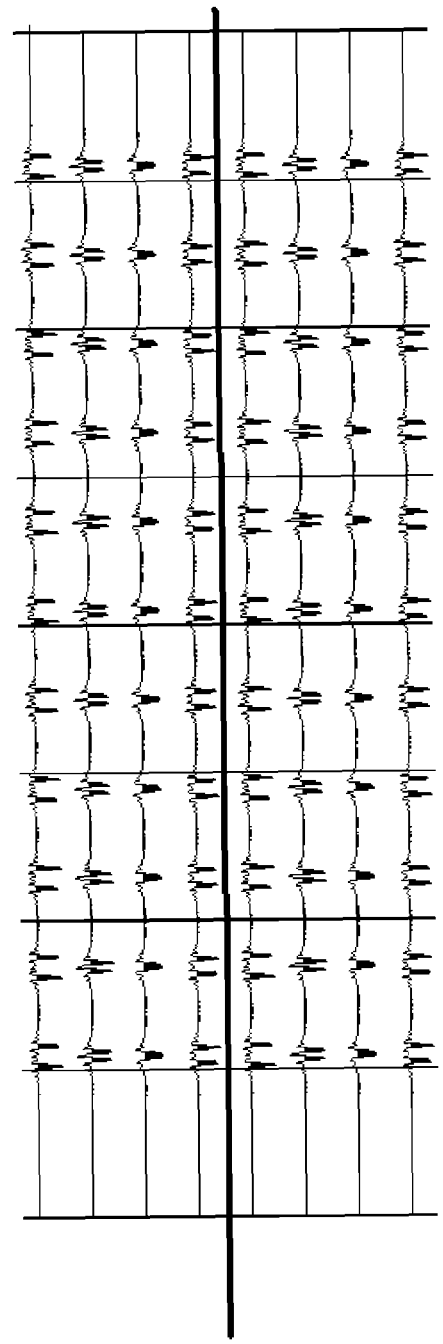
FIG. 10                FIG. 11

METHOD AND APPARATUS FOR MINIMIZING INTERFERENCE BETWEEN SEISMIC SYSTEMS

BACKGROUND OF THE INVENTION

1. Field of the Invention

Embodiments of the present invention relate generally to methods and apparatuses for minimizing interference between seismic systems. Particularly, various embodiments of the present invention minimize interference between seismic systems by frequency separating vibratory signals generated by the seismic systems.

2. Description of the Related Art

Multiple source and receiver seismic systems, often referred to in the art as high fidelity vibratory source (HFVS) or ZenSeis™ systems, can be utilized to generate seismic surveys of subterranean regions of the earth to facilitate in the recovery of various hydrocarbon resources. Multiple source and receiver seismic systems simultaneously generate a plurality of vibrations which, after reflecting or refracting from subterranean features, are measured by a plurality of receivers. Utilizing the receiver measurements and measurements made at the vibrating sources, a matrix inversion is performed to separate the vibratory signals for each source-receiver path. Often, it is difficult or impossible to utilize more than one multiple source and receiver seismic system in an area due to interference that may exist between the seismic systems.

SUMMARY

In one embodiment of the present invention, there is provided a method for generating seismic data. The method may generally include: (a) actuating a plurality of first sources associated with a first seismic system to generate a first plurality of phase-encoded vibratory signals; (b) actuating a plurality of second sources associated with a second seismic system to generate a second plurality of phase-encoded seismic signals that are at least partially frequency separated from the first plurality of phase-encoded vibratory signals generated in (a); and (c) detecting the first and second plurality of phase-encoded vibratory signals utilizing a first receiver positioned at a location remote from the first and second sources.

In another embodiment, there is provided a method for generalizing seismic data that generally comprises: (a) actuating a plurality of first sources associated with a first seismic system to generate a first plurality of phase-encoded vibratory signals; (b) after the actuation of (a), actuating a plurality of second sources associated with a second seismic system to generate a second plurality of phase-encoded vibratory signals; and (c) detecting the first and second plurality of phase-encoded vibratory signals utilizing a first receiver positioned at a location remote from the first and second sources.

In another embodiment, there is provided a method for generating seismic data that generally comprises: (a) actuating a plurality of first sources associated with a first seismic system to generate a first plurality of phase-encoded vibratory signals each having upsweeping frequencies; (b) actuating a plurality of second sources associated with a second seismic system to generate a second plurality of phase-encoded vibratory signals each having downsweeping frequencies; and (c) detecting the first and second plurality of phase-encoded vibratory signals utilizing a first receiver positioned at a location remote from the first and second sources.

In another embodiment, there is provided a method for generating seismic data that generally comprises: (a) actuating a plurality of first sources associated with a first seismic system to generate a first plurality of phase-encoded vibratory signals over a first frequency range; (b) actuating a plurality of second sources associated with a second seismic system to generate a second plurality of phase-encoded vibratory signals over a second frequency range, the first frequency range being different than the second frequency range; and (c) detecting the first and second plurality of phase-encoded vibratory signals utilizing a first receiver positioned at a location remote from the first and second sources.

In another embodiment, there is provided an apparatus for generating seismic data. The apparatus generally includes a first seismic system, a second seismic system, and a first receiver. The first seismic system includes a plurality of first sources operable to be actuated to generate a first plurality of phase-encoded vibratory signals and the second seismic system includes a plurality of second sources operable to be actuated to generate a second plurality of phase-encoded vibratory signals that are at least partially frequency separated from the first plurality of phase-encoded vibratory signals. The first receiver is positioned at a location remote from the first and second sources and is operable to detect the first and second plurality of phase-encoded vibratory signals.

BRIEF DESCRIPTION OF THE DRAWING FIGURES

Embodiments of the present invention are described in detail below with reference to the attached drawing figures, wherein:

FIG. 10 is an exemplary ideal inversion of the seismic data of FIG. 9;

FIG. 11 is an exemplary inversion of the seismic data of FIG. 9 where there is no delay between actuation of the sources of the first and second seismic systems;

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
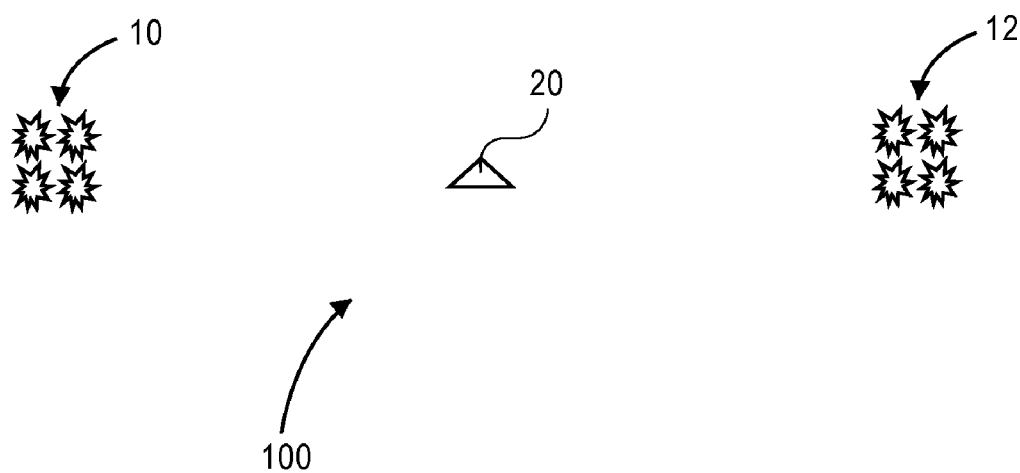
FIG. 1 is an environmental view of a first and second seismic system operable to be utilized by embodiments of the present invention.
Figure 2:
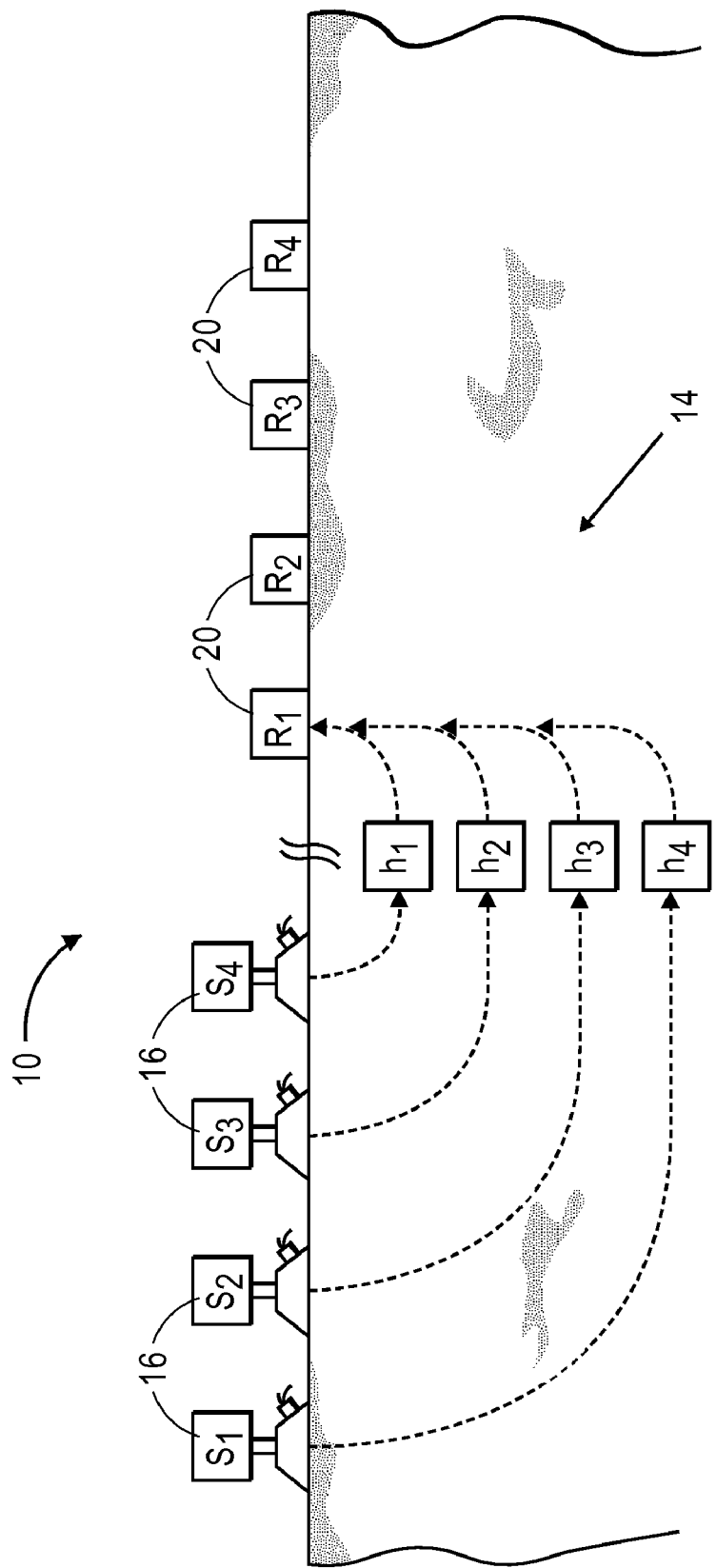
FIG. 2 is an environmental view of a multiple source and receiver seismic system operable to be utilized by embodiments of the present invention.
Figure 3:
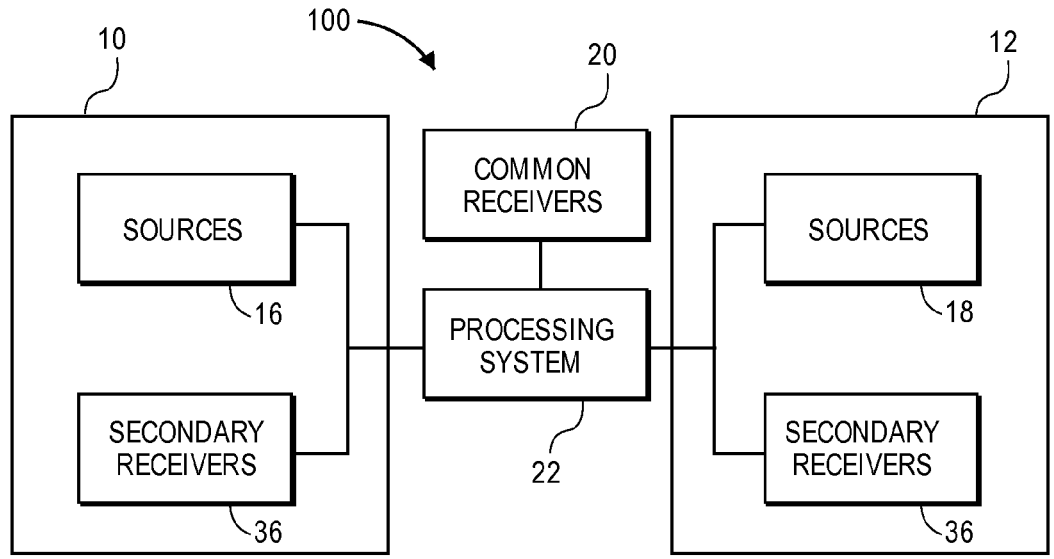
FIG. 3 is a block diagram illustrating a processing system coupled with sources and receives associated with the seismic systems of FIG. 1.

Referring initially to FIGS. 1-3, a first exemplary seismic system 10 and a second exemplary seismic system 12 are illustrated that may generate data for use by various embodiments of the present invention. In some embodiments, the seismic systems 10, 12 may cooperate to form an apparatus 100 for generating seismic data. Each seismic system 10, 12 may include a plurality of sources and receivers that may be positioned in a desired configuration to perform a seismic survey of a subterranean region 14. In some embodiments, the first seismic system 10 may include a plurality of first sources 16 and the second seismic system 12 may include a plurality of second sources 18. One or more common receivers 20, positioned at location remote from the sources 16, 18, may be utilized to detect signals generated by the sources 16, 18.

Each of the sources 16, 18 can be operable to impart a vibratory signal into the earth for reflection or refraction off portions of the subterranean region 14 for detection by one or more of the common receivers 20. The sources 16, 18 and common receivers 20 may comprise any element or combination of elements operable to perform these functions, including seismic vibrators and geophones. Secondary receivers 36 may be positioned in the proximity to the sources 16, 18 to record source signatures of the sources 16, 18 to facilitate in signal separation, as is discussed in more detail below. For example, one or more of the secondary receivers 36 may be positioned in proximity to the first sources 16 while one or more of the other secondary receivers 36 may be positioned in proximity to the second sources 18.

Referring to FIG. 3, a processing system 22 operable to be utilized by embodiments of the present invention is illustrated. In some embodiments, the processing system 22 can be operable to interface with the first and second seismic systems 10, 12 to acquire data therefrom. For example, the processing system 22 may couple with the first sources 16, second sources 18, and common receivers 20 to acquire data therefrom. The processing system 22 can also be adapted to control the operation of the seismic systems 10, 12 and common receivers 20. In some embodiments, the processing system 22 can communicate with the sources 16, 18 and common receivers 20 through a communication network, such as a local network or the internet, or be directly Coupled with the sources 16, 18 and common receivers 20. Further, the processing system 22 may include portions, such as a plurality of processing systems or memory elements, that may be separately coupled with the seismic systems 10, 12 and common receivers 20 to acquire data and then interfaced to share and/or process the acquired data. However, in some embodiments the processing system 22 is not necessarily coupled with the sources 16, 18 and common receivers 20 in any manner, as is discussed in more detail below.

Figure 4:
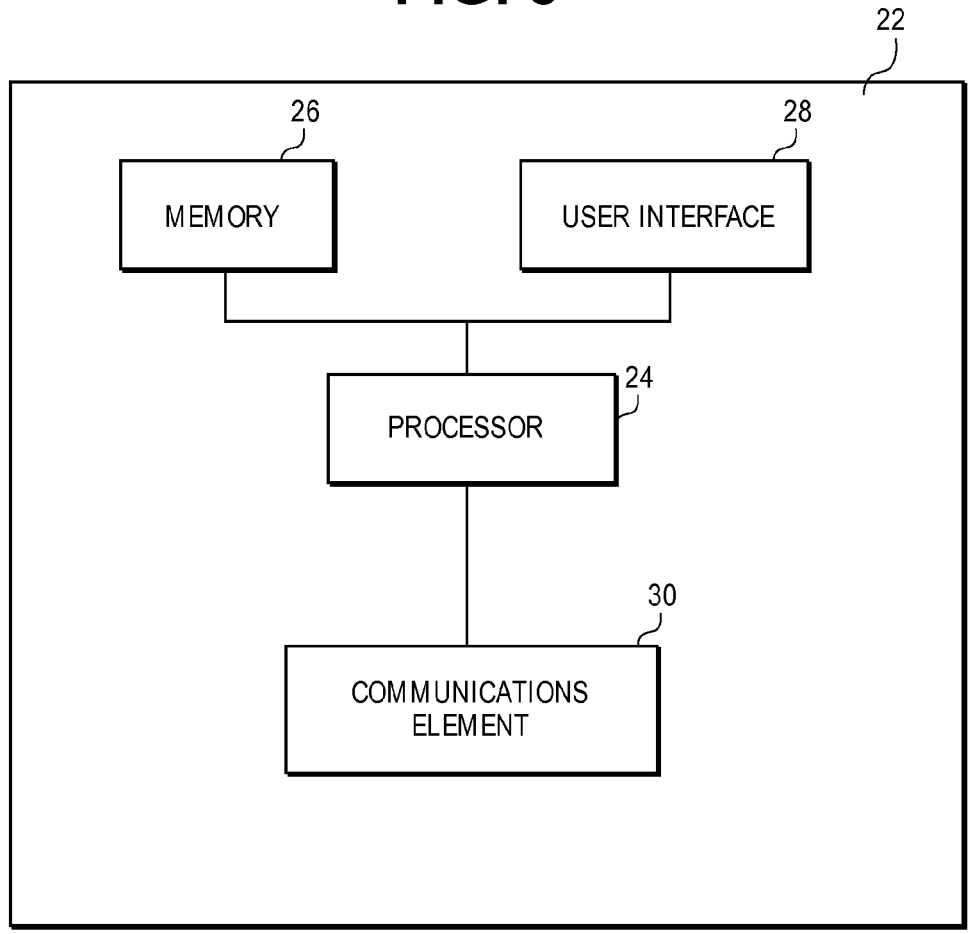
FIG. 4 is a block diagram showing some of the components of the processing system of FIG. 3.

Referring to FIG. 4, various elements of the processing system 22 are illustrated. In some embodiments, the processing system 22 may include a processor 24, a memory 26, a user interface 28, and a communications element 30. The processor 24 can be generally operable to process data. The processor 24 can comprise various computing and control elements such as microprocessors, microcontrollers, programmable logic devices such as field programmable gate arrays, computing devices such as personal computers, portable computing equipment, servers, distributed computing elements, discrete analog and digital logic, application specific integrated circuits, combinations thereof, and the like. In some embodiments, the processor 24 can comprise a plurality of computing elements such that one or more of the functions discussed below can be implemented utilizing a first computing element and one or more other functions can be implemented utilizing a second computing element.

The memory 26 is operable to couple with the processor 24 and store data such as seismic data generated by the seismic systems 10, 12. The memory 26 can be a computer-readable medium and comprise various memory elements such as electronic, magnetic, optical, electromagnetic, infrared, or semi-conductor based memory elements. More specific, although not inclusive, examples of the computer-readable medium include the following: an electrical connection having one or more wires, a portable computer diskette, a random access memory (RAM), a read-only memory (ROM), an erasable, programmable, read-only memory (EPROM or Flash memory), an optical fiber, a portable compact disc (CD), a digital video disc (DVD), a magnetic tape, combinations thereof, and the like. In some embodiments, at least portions of the memory 26 may be configured as a removable memory element operable to be removably coupled with the processor 24 and seismic systems 10, 12.

In various embodiments, the memory 26 may include a computer program operable to control functions of the processing system 22. The memory 26 may comprise a plurality of memories such that the computer program may be stored on one memory while acquired seismic data may be stored on another memory. The computer program may comprise instructions for implementing functions in the processing system 22 and/or other associated devices such that the program is not limited to functioning and/or controlling only the processing system 22. The program can comprise various code segments, which each delay include one or more instructions, one or more instruction lists, only a portion of an instruction list, and/or only a portion of an instruction. Code segments may include overlapping lists of instructions—that is, a first code segment may include at least portions of instructions A and B, and a second code segment may include at least portions of instructions B and C. Each code segment may be embodied as human-readable source code or script, as machine-readable object code, and/or as one or more machine-executable files such as compiled source code. Further, the computer program may comprise one or more computer programs each including any number of code segments to perform any of the functions disclosed herein.

However, embodiments of the present invention may be implemented in hardware, software, firmware, and/or combinations thereof and are not limited to the computer program and processing system 22 discussed herein. The computer program and processing system 22 are merely examples of a program and equipment that may be used to implement embodiments of the present invention and may be replaced with other software and/or equipment without departing from the scope of the present teachings.

The user interface 28 enables users, third parties, or other devices to share information with the processing system 22. The user interface 28 may comprise one or more functionable inputs such as buttons, switches, a keyboard, scroll wheels, and the like, a touch screen display, voice recognition elements such as a microphone, pointing devices such as mice, touchpads, trackballs, styluses, combinations thereof, and the like. Further, the user interface 28 may comprise wired or wireless data transfer elements such as removable memory including the memory 26, data transceivers, and the like, to enable the user and other devices or parties to remotely interface with the processing system 22.

The communications element 30 enables the processing system 22 to communicate with other devices through a communication network, such as the Internet, a local area network, a wide area network, an ad hoc or peer to peer network, or a direct connection such as a USB, Firewire, or Bluetooth connection, and the like. In various embodiments the communications element 30 may enable the processing system 22 to wirelessly communicate with communications networks utilizing wired or wireless data transfer methods such as WiFi (802.11), Wi-Max, Bluetooth, ultra-wideband, infrared, cellular telephony, radio frequency, Ethernet, and the like.

In some embodiments, the processing system 22 may include a plurality of processing systems, such as where a first processing system is associated with the first seismic system, 0 and a second processing system is associated with the second seismic system 12. Each processing system may be configured as described above and include a processor, memory, user interface, and/or communications element. The processing systems may be adapted to perform different functions such that the functions performed by the processing system 22 may be performed by discrete and separate processing systems.

Figure 5:
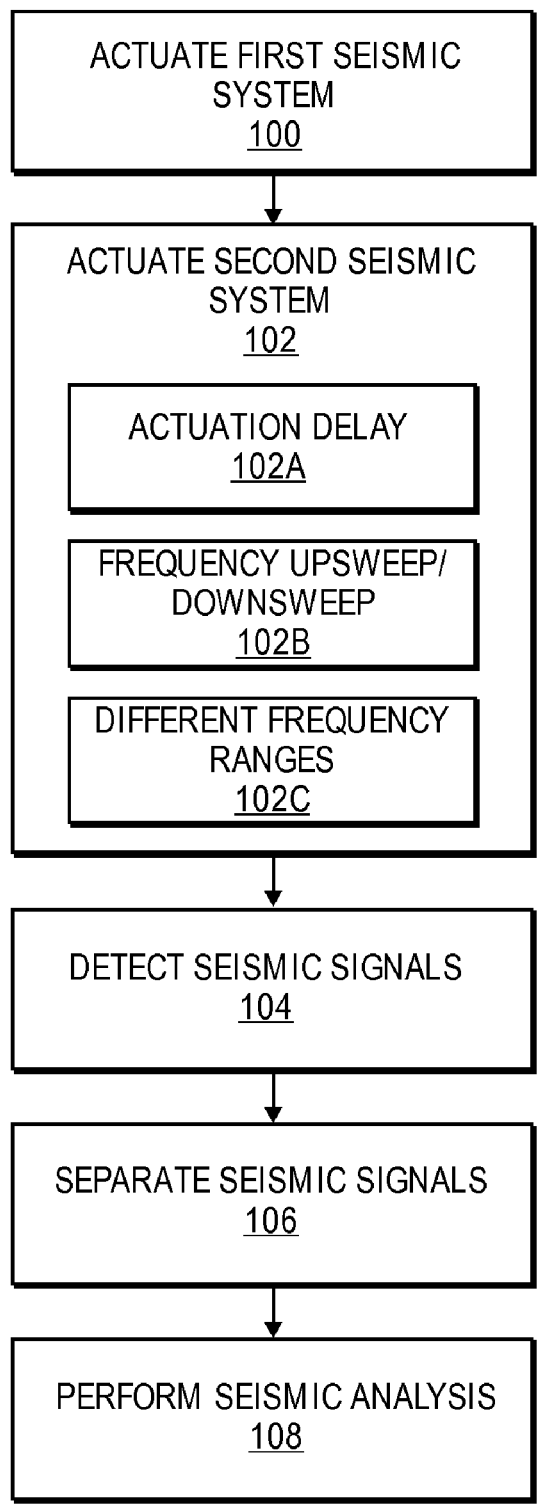
FIG. 5 is a flow chart illustrating some of the steps that may be performed by various embodiments of the present invention.

Referring to FIG. 5, a flowchart of some of the functions that may be performed by embodiments of the present invention is illustrated as steps 100-108. Some of the blocks of the flow chart may represent one or more code segments comprising at least a portion of the computer program. Steps 100-108 may be performed in any order and are not limited to the specific order described herein. Further, steps 100-108 may be performed simultaneously or concurrently such that the steps are not necessarily sequential. Further, steps 100-108 are not each necessarily performed by embodiments of the present invention.

In step 100, the first sources 16 associated with the first seismic system 10 are actuated to generate a first plurality of phase-encoded vibratory signals 32. The first sources 16 may be actuated such that each of the first plurality of phase-encoded vibratory signals 32 are generated simultaneously. The first plurality of phase-encoded vibratory signals 32 are phase encoded to facilitate their separation in step 106, as is discussed in more detail below. "Phase encoded," as utilized herein, refers to at least a partial phase difference between at least two of the first plurality of phase-encoded vibratory signals 32 simultaneously generated by the first sources 16.

For example, the phase-encoding of the first plurality of phase-encoded vibratory signals 32 may be a 0°-90° encoding where a first one of the first sources 16 generates a vibratory signal that is 90° out of phase relative to a vibratory signal generated by a second one of the first sources 16. Similarly, where the first sources 16 include more than two sources, the generated signals may be phase-encoded by 0°, 30°, 60°, or 90° in any given sweep to facilitate later separation.

Additionally or alternatively, the phase-encoding of the first plurality of phase-encoded vibratory signals 32 may correspond to:

TABLE 1

| | FIRST SOURCE | SECOND SOURCE | THIRD SOURCE | FOURTH SOURCE |
| --- | --- | --- | --- | --- |
| SWEEP 1 | 0° | 30° | 60° | 90° |
| SWEEP 2 | 30° | 0° | 90° | 60° |
| SWEEP 3 | 60° | 90° | 0° | 30° |
| SWEEP 4 | 90° | 60° | 30° | 0° |

However, the first plurality of phase-encoded vibratory signals 32 may be phase-encoded utilizing any methods known in the art, including pseudo-random encodings and/or phase encodings optimized by Monte-Carlo methods, and are not limited to the exemplary phase encodings discussed above.

In step 102, the second sources 18 associated with a second seismic system 12 are actuated to generate a second plurality of phase-encoded vibratory signals 34 that are at least partially frequency separated from the first plurality of phase-encoded vibratory signals 32 generated in step 100. "Frequency separated," as utilized herein, refers to at least a partial difference in frequency between the first plurality of phase-encoded vibratory signals 32 and second plurality of phase-encoded vibratory signals 34.

The second sources 18 may be actuated such that each of the second plurality of phase-encoded vibratory signals 34 are generated simultaneously. The second plurality of phase-encoded signals 34 may be phase encoded in a similar manner to the first plurality of phase-encoded vibratory signals 32 discussed in step 100. Thus, at least a partial phase difference can exist between at least two of the second plurality of phase-encoded vibratory signals 34 simultaneously generated by the second sources 18. The second plurality of phase-encoded signals 34 may have the same phase-encoding scheme as the first plurality of phase-encoded vibratory signals 32 or employ a different phase encoding scheme.

The second plurality of phase-encoded vibratory signals 34 may be frequency separated from the first plurality of phase-encoded vibratory signals 32 in any manner that enables at a least a partial difference in frequency between the first plurality of phase-encoded vibratory signals 32 and second plurality of phase-encoded vibratory signals 34. For example, the frequency separation may be achieved by utilizing an activation delay, as referenced in step 102(A), by utilizing frequency upsweeps and/or downsweeps, as referenced in step 102(B), and/or by utilizing different frequency ranges, as referenced in step 102(C). Any one or combination of steps 102(A)-(C) may be performed to achieve the desired frequency separation.

Figure 6:
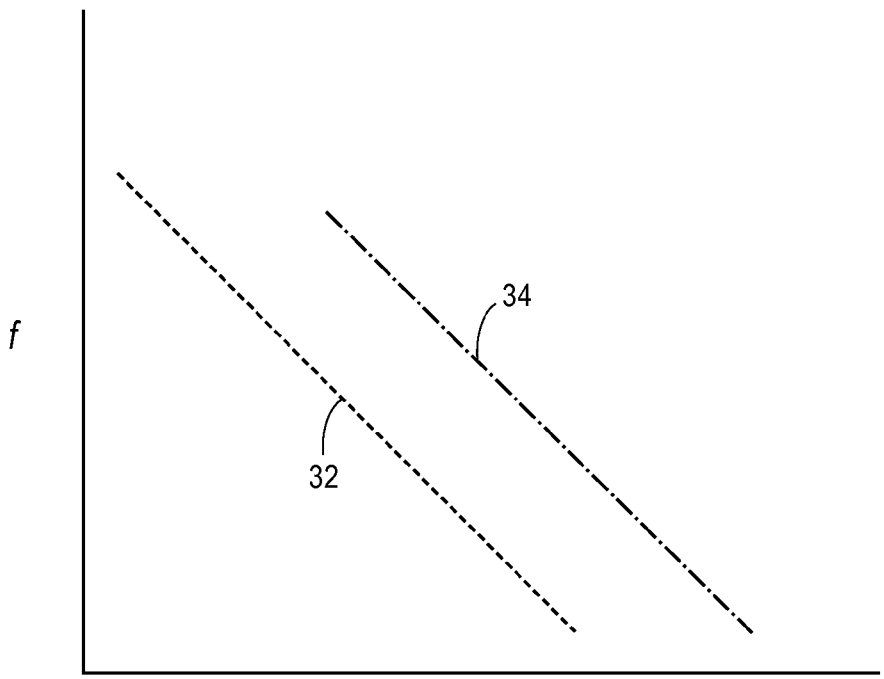
FIG. 6 is a graph illustrating the frequencies of vibratory signals generated by the first and second seismic systems of FIG. 1 where the first seismic system begins generating signals before the second seismic system begins generating signals.

To achieve frequency separation in step 102(A), the second plurality of phase-encoded vibratory signals 34 are generated after the first plurality of phase-encoded vibratory signals 32, as is illustrated in FIG. 6. Thus, step 102 may be performed after step 100 such that the first plurality of phase-encoded vibratory signals 32 begin propagating through the subterranean region 14 before the second plurality of phase-encoded vibratory signals 34.

Any delay may be utilized between steps 100 and 102 to achieve frequency separation between the vibratory signals 32, 34. In some embodiments, an optimal source delay time may be selected based on data bandwidth and/or listening time. "Listening time" is the time between the end of a sweep and the end of recording by one or more of the common receivers 20. The source delay time can be greater than or equal to the listening time to provide a desired amount of frequency separation. For example, if the listening time is 4 seconds, the delay between steps 100 and 102 can be greater or equal to 4 seconds to provide a desired amount of frequency separation. If it is desirable to reduce the data bandwidth after source separation, the delay between steps 100 and 102 may be reduced to correspond to the reduction in data bandwidth. The optimal source delay between steps 100 and 102 may be analytically estimated and/or empirically derived from available seismic and system data.

As should be appreciated, the optimal source delay time may be selected to correspond to any listening time or any other period of time and the 4 second listening time discussed above is merely exemplary. For example, the listening time and optimal source delay time can vary based on the particular geographic location of the seismic systems 10, 12 such that innumerable delays other than 4 seconds may be utilized.

Figure 7:
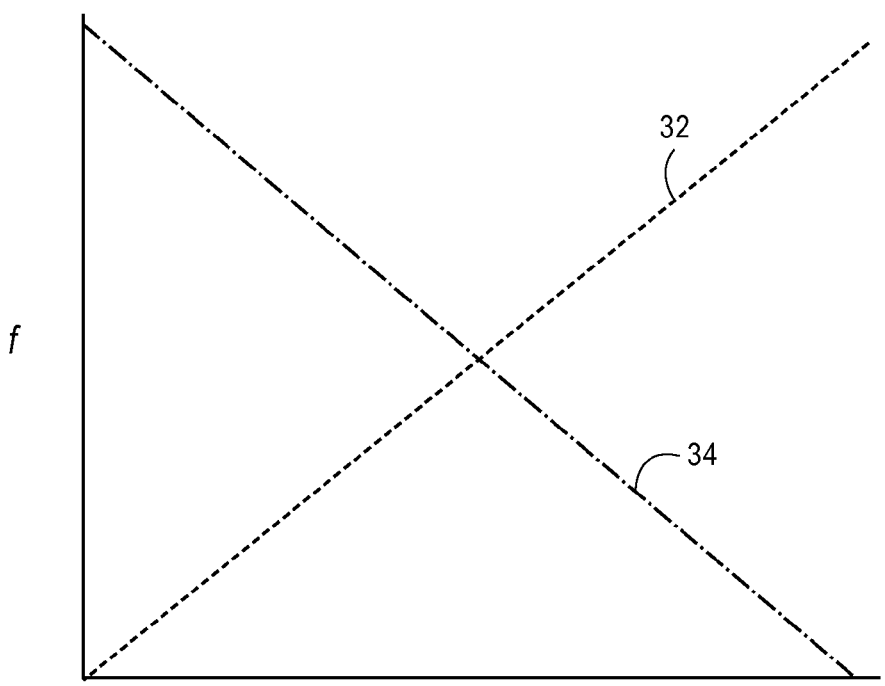
FIG. 7 is a graph illustrating the frequencies of vibratory signals generated by the first and second seismic systems of FIG. 1 where the first seismic system performs a frequency upsweep and the second seismic system performs a frequency downsweep.

To achieve frequency separation in step 102(B), the phase-encoded vibratory signals 32, 34 are actuated such that they sweep in different directions. For example, as illustrated in FIG. 7, each of the first plurality of phase-encoded vibratory signals 32 may be generated with upsweeping frequencies and each of the second plurality of phase-encoded vibratory signals 34 may be generated with downsweeping frequencies such that the frequencies of the vibratory signals 32, 34 match only at one intersection point. The phase-encoded vibratory signals 32, 34 may be swept over the same frequency ranges such that the second vibratory signals 34 begin at the frequency at which the first vibratory signals 32 terminate. However, the vibratory signals 32, 34 may be swept over any uniform and non-uniform frequency ranges to achieve any desired frequency separation.

Figure 8:
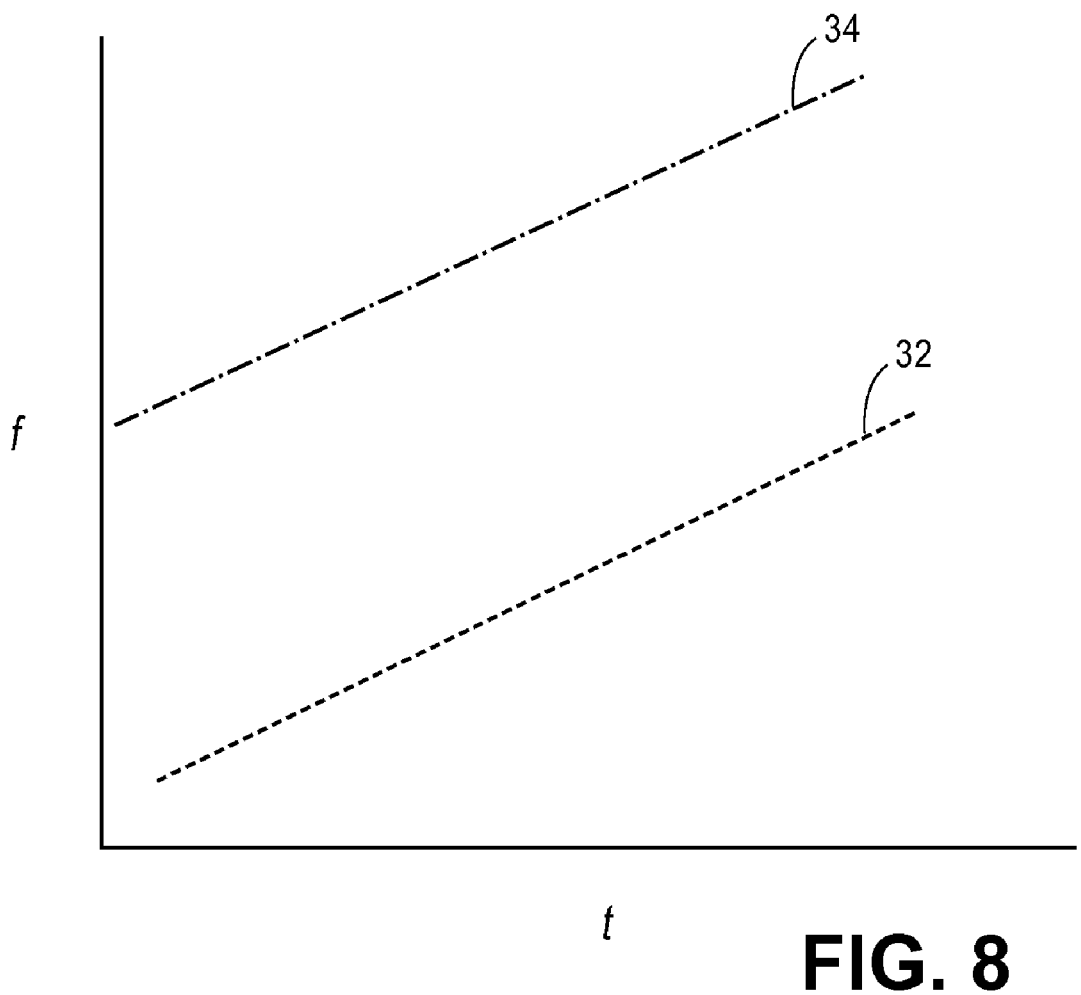
FIG. 8 is a graph illustrating the frequencies of vibratory signals generated by the first and second seismic systems of FIG. 1 where the first seismic system generates signals over a first frequency range and the second seismic system generates signals over a second frequency range.

To achieve frequency separation in step 1*e* the sources 16, 18 are actuated such that the phase-encoded vibratory signals 32, 34 are generated over different frequency ranges. For example, as illustrated in FIG. 8, the first sources 16 may be actuated to generate the first plurality of phase-encoded vibratory signals 32 over a first frequency range and the second sources 18 may be actuated to generate the second plurality of phase-encoded vibratory signals 34 over a second frequency range, where the second frequency range is different than the first frequency range and the ranges do not overlap. However, in some embodiments, the first and second frequency ranges may partially overlap. The phase-encoded vibratory signals 32, 34 may each upsweep and/or downsweep within each frequency range.

The first plurality of phase-encoded vibratory signals 32 may be frequency separated from the second plurality of phase-encoded vibratory signals 34 utilizing any combination of the above-methods or any other methods. Thus, the phase-encoded vibratory signals 32, 34 may utilize any delay, sweep in any direction, and occupy any frequency bandwidth to achieve a desired amount of frequency separation. For example, any change in frequency may be imparted to the second plurality of phase-encoded vibratory signals 34 by the second sources 18 to achieve frequency separation with the first plurality of phase-encoded vibratory signals 32.

In step 104, the first and second plurality of phase-encoded vibratory signals 32, 34 are detected utilizing at least one of the common receivers 20 positioned at a location remote from the first and second sources 16, 18. Each of the common receivers 20 may generate receiver data corresponding to the phase-encoded vibratory signals 32, 34 generated by the sources 16, 18. Thus, the receiver data can include data corresponding to one or more phase-encoded sweeps performed by each seismic system 10, 12 in a manner consistent with high fidelity vibratory source and other multiple source and receiver seismic techniques.

The secondary receivers 36 may also detect the phase-encoded vibratory signals 32, 34 in step 104. For example, source data may be generated in addition to the receiver data discussed above to facilitate in signal separation, as is discussed in more detail below. The source data may include data provided by the secondary receivers 36 that corresponds both to the first plurality of phase-encoded vibratory signals 32 detected at a location in proximity to the first sources 16 and the second plurality of phase-encoded vibratory signals 34 detected at a location in proximity to the second sources 18.

The receiver and source data generated by the common receivers 20 and/or secondary receivers 36 may be provided to the processing system 22 for processing and analysis in step 106. The acquired source and receiver data can be represented in any form operable to be utilized by the processing system 22 and is not limited to representing data in a time and amplitude format.

In some embodiments, the processing system 22 can acquire the source and receiver data by coupling with one or more portions of the seismic systems 10, 12, such as one or more of the sources 16, 18 common receivers 20, and/or secondary receivers 36. The processing system 22 can also acquire the source and receiver data by utilizing the memory 26. For example, the memory 26 can be coupled with portions of the seismic systems 10, 12 to acquire seismic data therefrom and then be transported to the processing system 22 for analysis. The processing system 22 can also acquire the source and receiver data by accessing the seismic systems 10, 12 or other devices through the communications network.

The seismic systems 10, 12 and common receivers 20 may be positioned in any configuration to perform one or more seismic surveys. In some embodiments, the seismic systems 10, 12 may be positioned to limit signal overlap. For example, the seismic systems 10, 12 may be positioned such that the secondary receivers 36 associated with each seismic system 10, 12 are not contaminated by signals generated by the other seismic system 10, 12. Similarly, the seismic systems 10, 12 may be positioned so as to not overpower the common receivers 20.

In some embodiments, the seismic systems 10, 12, including the first sources 16 and second sources 18, may be positioned using an offset range and/or angle defined between the seismic systems 10, 12. For example, a minimum offset range m and maximum offset range M may be defined based on various characteristics of the sources 16, 18 and/or receivers 20, 36. The seismic systems 10, 12 can be placed such that the offset range between the systems 10, 12 is greater than the minimum offset range m but less than the maximum offset range M. In embodiments where there are more than two seismic systems, two or more of the seismic systems may be selected to simultaneously operate based on the ranges m and M such that the selected seismic systems present offset ranges greater than the minimum offset range m but less than the maximum offset range M. Further, in some embodiments, the sources 16, 18 utilized by each seismic system 10, 12 may be selected and/or positioned in a similar manner based on the offsets between each of the sources 16 or 18. For example, a first group of sources included within the first sources 16 may be selected for simultaneous operation based on the minimum and maximum offset range criteria discussed above.

In step 106, the phase-encoded vibratory signals 32, 34 generated by the sources 16, 18 and detected by one or more of the common receivers 20 are separated. To separate the signals 32, 34, the processing system 22 may perform a matrix inversion utilizing the data acquired by one or more of the common receivers 20 and the secondary receivers 36. The matrix inversion in the frequency domain can use the following matrices:

$$\begin{bmatrix} FS_{11} & FS_{12} & \cdots & FS_{1N} \\ FS_{21} & FS_{22} & \cdots & FS_{2N} \\ & & \cdots & \\ FS_{M1} & FS_{M2} & \cdots & FS_{MN} \end{bmatrix} \begin{bmatrix} Fh_1 \\ Fh_2 \\ \cdots \\ Fh_N \end{bmatrix} = \begin{bmatrix} D_1 \\ D_2 \\ \cdots \\ D_M \end{bmatrix}, \quad (1)$$

$$\begin{bmatrix} SS_{11} & SS_{12} & \cdots & SS_{1N} \\ SS_{21} & SS_{22} & \cdots & SS_{2N} \\ & & \cdots & \\ SS_{M1} & SS_{M2} & \cdots & SS_{MN} \end{bmatrix} \begin{bmatrix} Sh_1 \\ Sh_2 \\ \cdots \\ Sh_N \end{bmatrix} = \begin{bmatrix} D_1 \\ D_2 \\ \cdots \\ D_M \end{bmatrix}, \quad (2)$$

where M is the number of traces represented by the seismic data, N is the number of sources associated with each of the sources 16, 18, $FS_{MN}$ corresponds to the source data for the first seismic system 10, $SS_{MN}$ corresponds to the source data for the second seismic system 12, $D_M$ corresponds to the receiver data generated by one or more of the common receivers 20, and $Fh_N$ and $Sh_N$ correspond to transfer functions associated with various source-receiver paths, some of which are illustrated in FIG. 2. Although in the above example the matrices for each of the systems 10, 12 include the same number of sources 16, 18, any number of sources 16, 18 may be utilized by embodiments of the present invention.

If M=N, the system of simultaneous equations given by the above-matrix can be solved in the frequency domain for h:

$$\vec{Fh} = [FS]^{-1}\vec{D} \quad (3),$$

$$\vec{Sh} = [SS]^{-1}\vec{D} \quad (4).$$

If M>N the simultaneous equations given the matrices of (1) of (2) can be solved by the method of least squares (e.g., $[FS]^{-1}=(FS^*FS)^{-1}FS^*$) or by other similar methods and techniques. As should be appreciated, the particular formulation of the M×N matrices, [FS], [SS], and their inverses can vary based upon the number of sources 16, 18 and common receivers 20 (repeated sweeps) employed and the functionality provided by each of the sources 16, 18 and common receivers 20.

Utilizing the above, the processing system 22 can solve for the transfer functions $Fh_N$ and $Sh_N$ for each source-receiver path and separate the vibratory signals at selected frequencies represented by the seismic data to facilitate seismic analysis in step 106. However, as should be appreciated, various separation and matrix inversion techniques are known in the art, each of which can be employed by embodiments of the present invention.

The processing system 22 can utilize the phase encoding of the phase-encoded vibratory signals 32, 34 to facilitate in their separation. Thus, the frequency separation of the vibratory signals 32, 34 enables the processing system 22 to separate the phase-encoded vibratory signals 32, 34 based on which system 10, 12 they correspond to while the phase-encoding of the vibratory signals 32, 34 enables the processing system 22 to separate the signals 32, 34 within each system 10, 12.

The processing system 22 can store the data corresponding to the matrix inversion performed in step 104 within the memory 26 for later use and analysis as is discussed in more detail below. The processing system 22 can also provide such data to other devices through the communications network by utilizing the communications element 30. In some embodiments, the processing system 22 can present a visual indication of the separated vibratory signals and data associated therewith by utilizing the user interface 28.

Figure 9:
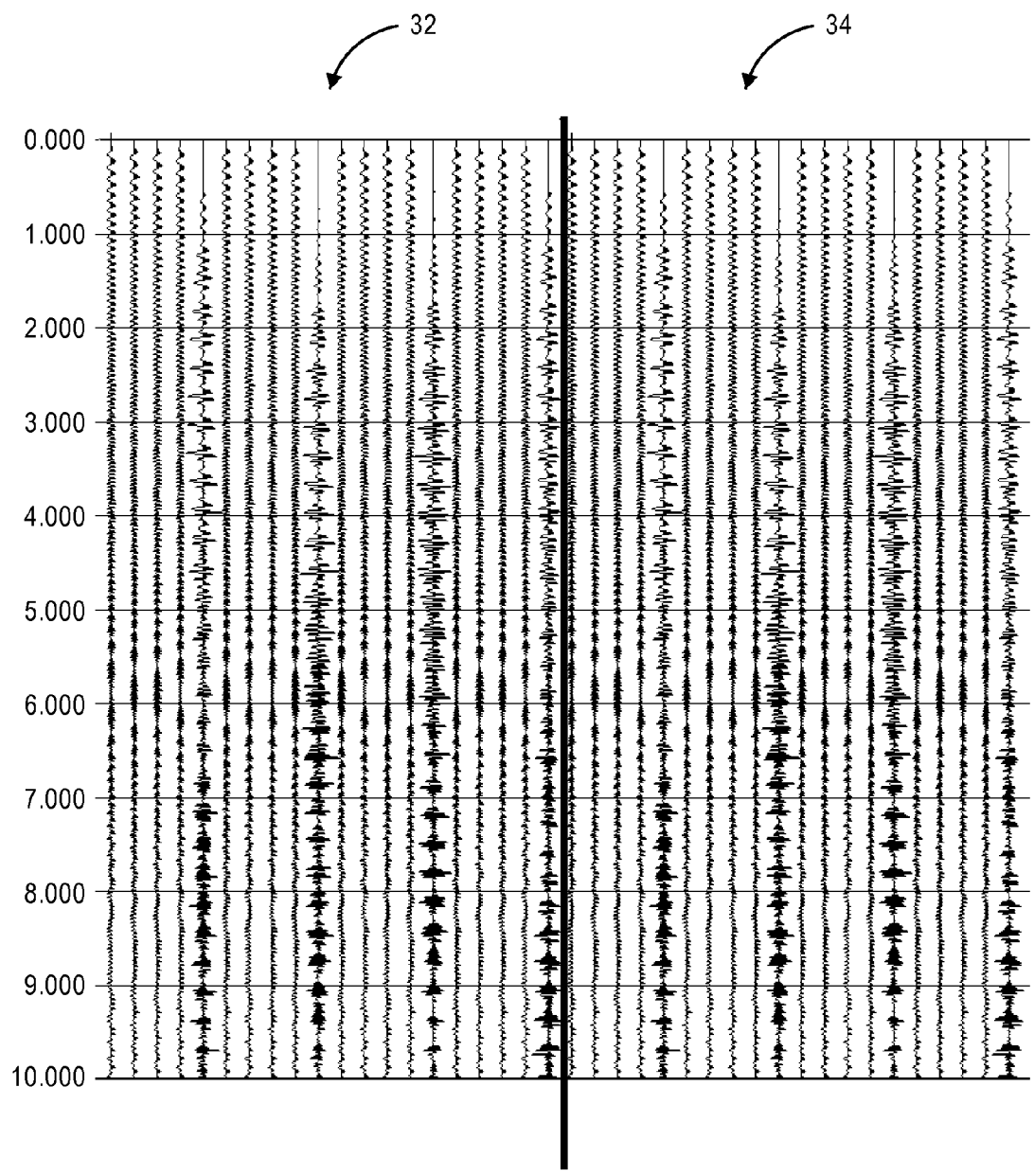
FIG. 9 is an exemplary seismograph illustrating vibratory signals generated by the first and second seismic systems of FIG. 1 where there is no delay between actuation of the sources of the first and second seismic systems.
Figure 12:
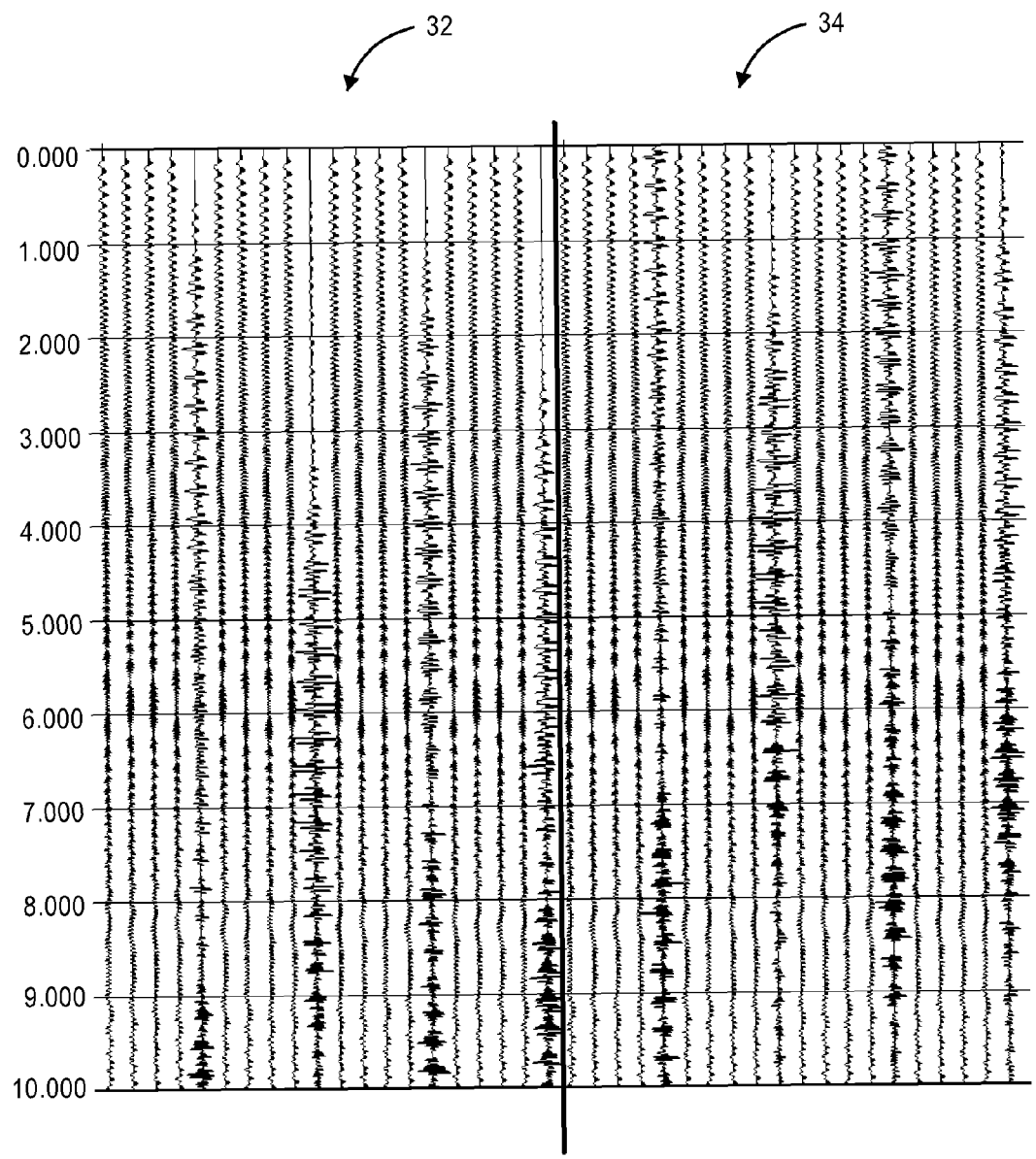
FIG. 12 is an exemplary seismograph illustrating vibratory signals generated by the first and second seismic systems of FIG. 1 where there is an exemplary 2 second delay between actuation of the sources of the first and second seismic systems.
Figure 13:
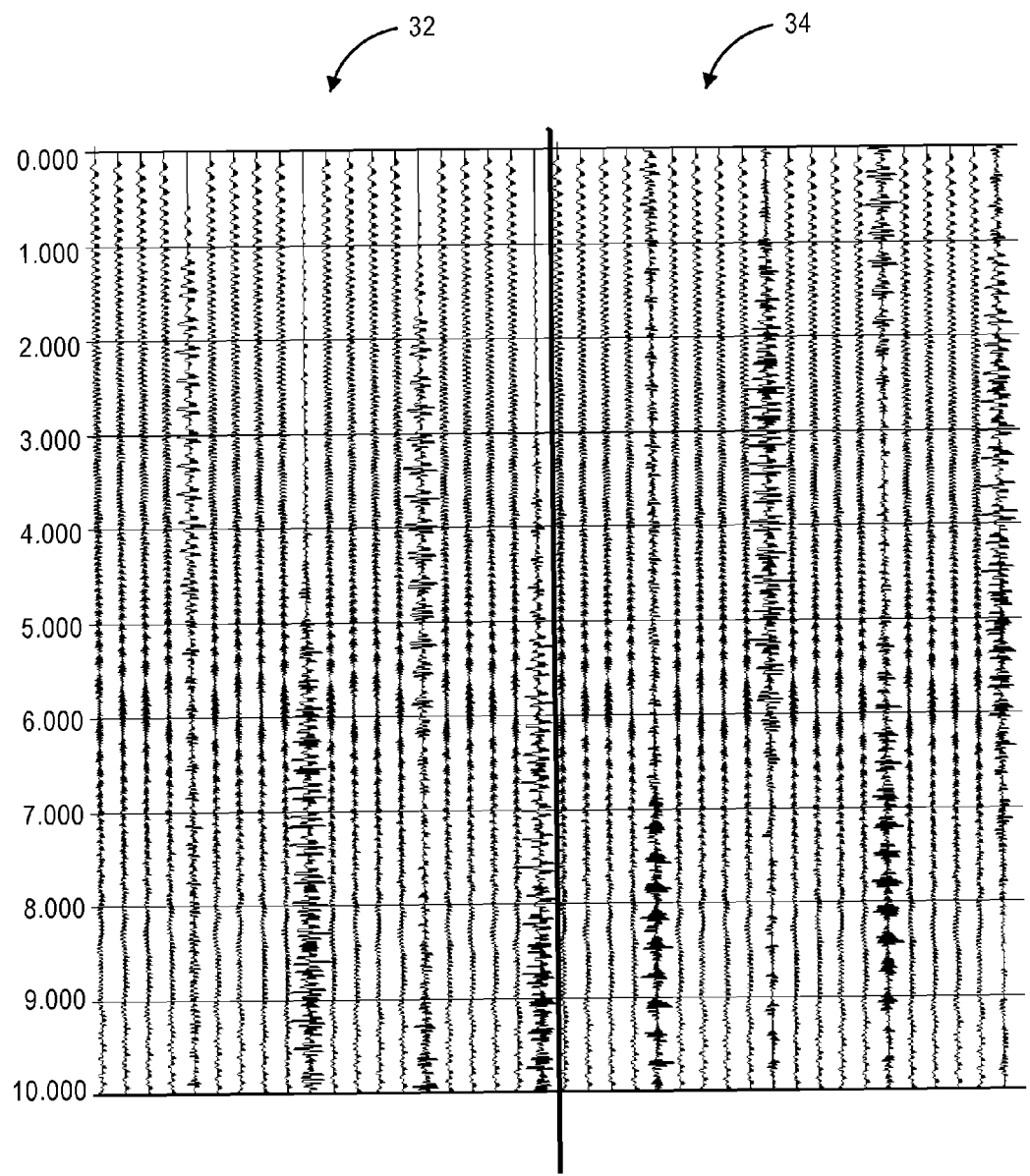
FIG. 13 is an exemplary seismograph illustrating vibratory signals generated by the first and second seismic systems of FIG. 1 where there is an exemplary 4 second delay between actuation of the sources of the first and second seismic systems.
Figure 14:
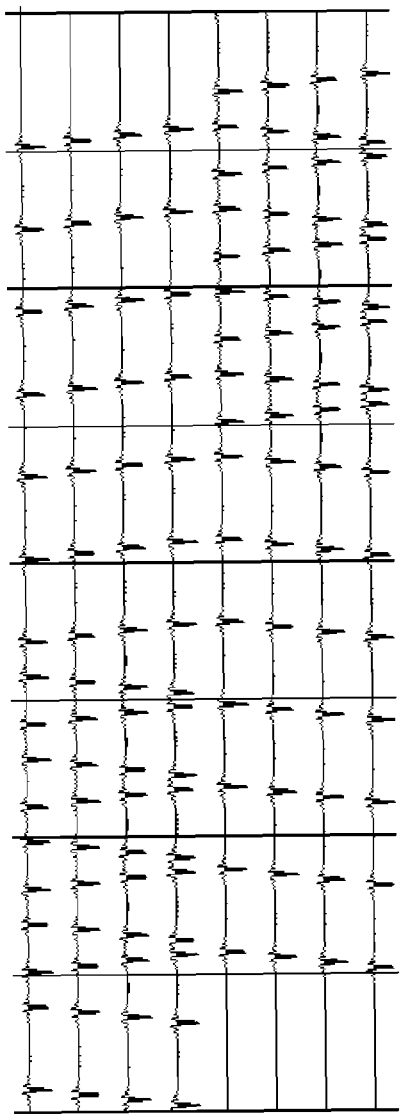
FIG. 14 is an exemplary inversion of the seismic data of FIG. 12 where there is an exemplary 2 second delay between actuation of the sources of the first and second seismic systems.
Figure 15:
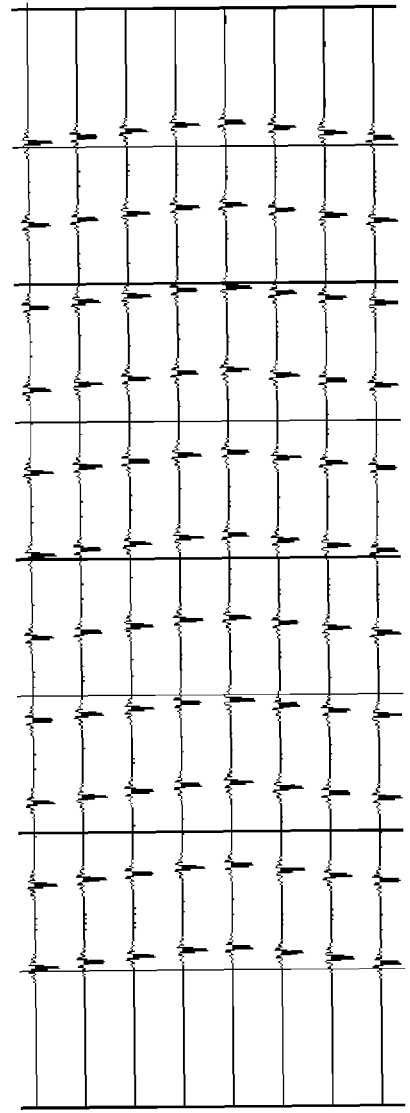
FIG. 15 is an exemplary inversion of the seismic data of FIG. 13 where there is an exemplary 4 second delay between actuation of the sources of the first and second seismic systems.
Figure 16:
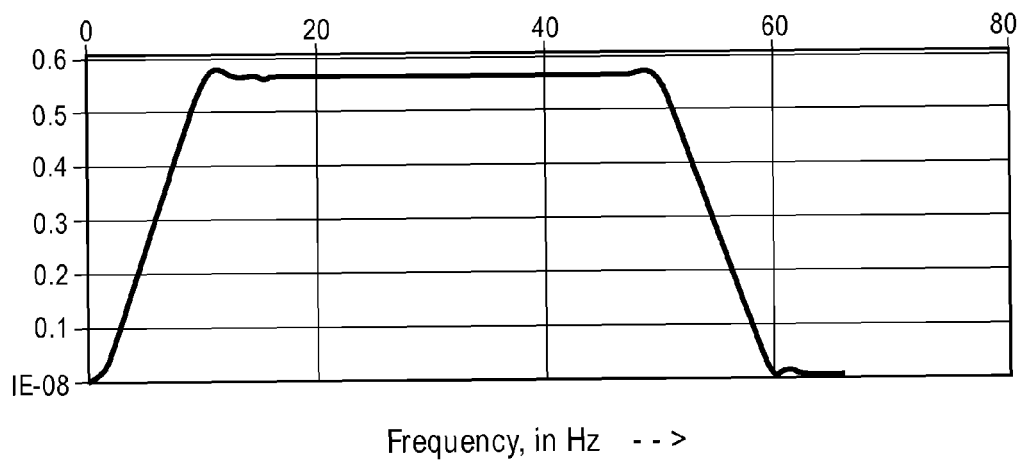
FIG. 16 is an exemplary ideal amplitude spectra of the seismic data of FIG. 13.
Figure 17:
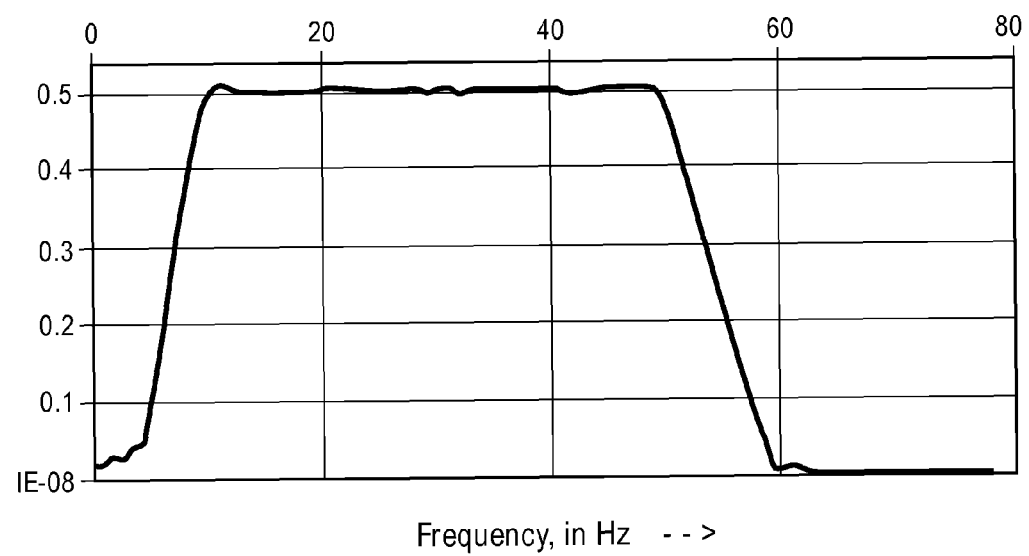
FIG. 17 is an exemplary amplitude spectra of the seismic data of FIG. 13 where there is a 4 second delay between actuation of the sources of the first and second seismic systems.

Frequency separation of the phase-encoded vibratory signals 32, 34 may facilitate in the proper separation and inversion of the vibratory signals 32, 34. For example, FIG. 10 presents an ideal inversion of the signals of FIG. 9 where the signals are not frequency separated. As illustrated in FIG. 11, inversion of the actual signals of FIG. 9 produces generally undesirable results. However, when the vibratory signals 32, 34 are frequency separated as in FIGS. 12-13, the results of the inversion are generally more desirable. For example, the inversion of FIG. 15, corresponding to a listening time of 4 seconds and a delay of 4 seconds between actuation of the seismic systems 10, 12, generally matches the ideal inversion of FIG. 10. The inversion of FIG. 14, corresponding to a listening time of 4 seconds and a delay of 2 seconds between the actuation of the seismic systems 10, 12, produces less than ideal results. Comparison of the amplitude spectra of FIG. 17, corresponding to a 4 second delay between actuation of the systems 10, 12, to the ideal amplitude spectra of FIG. 16, further demonstrates some of the desirable aspects of using frequency separated vibratory signals. Frequency separation utilizing methods other than actuation delay can similarly produce desirable separation and inversion.

In step 108, a seismic analysis can be performed utilizing the separation data generated in step 106. For example, a frequency and/or time-domain seismic survey can be generated utilizing the transfer functions $Fh_N$, $Sh_N$, and/or data corresponding to signals detected by the common receivers 20. Such surveys can be generated utilizing various post-inversion analysis and processing methods, including frequency domain multiplication, inverse discrete Fourier transforms, stacking of cross-correlation records, common depth point (CDP) gathers, normal move-out (NMO) operations and associated corrections, combinations thereof, and the like. Additional or alternative post-inversion analysis and processing can also be employed by embodiments of the present invention, including post-inversion noise attenuation for additive and/or convolutional noise types.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone: A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "simultaneously" means occurring at the same time or about the same time, including concurrently.

As used herein, the term "phase encoded" means at least a partial phase difference between at least two vibratory signals simultaneously generated by the first sources 16 or second sources 18.

As used herein, the term "frequency separated" means at least a partial difference in frequency between the first plurality of phase-encoded vibratory signals 32 and second plurality of phase-encoded vibratory signals 34.

As used herein, the term "listening time" is the time between the end of a sweep and the end of recording by one or more of the common receivers 20.

What is claimed is:

1. A method for generating seismic data utilizing at least two groups or systems of seismic sources where one group or system is able to emit seismic signals while another group or system continues to emit seismic signals, said method comprising:
    (a) actuating a plurality of first sources associated with a first seismic system to generate a first plurality of phase-encoded vibratory signals wherein each of said first sources is out of phase with respect to other sources in said plurality of first sources;
    (b) while the first sources are generating phase-encoded signals, actuating a plurality of second sources associated with a second seismic system to generate a second plurality of phase-encoded vibratory signals that are at least partially frequency separated from said first plurality of phase-encoded vibratory signals generated in (a) and wherein each of said second sources is out of phase with respect to other sources in said plurality of second sources;
    (c) detecting said first and second plurality of phase-encoded vibratory signals utilizing one or more first receivers positioned at a location remote from said first and second sources;
    (d) detecting said first plurality of phase-encoded vibratory signals utilizing one or more second receivers that are not contaminated by signals from the second sources; and
    (e) detecting said second plurality of phase-encoded vibratory signals utilizing one or more second receivers that are not contaminated by signals from the first sources,
    (f) recording the detected signals from the first and second sources where the signals from each source that are detected by the first receivers are separable from other sources.

2. The method of claim 1, wherein said second plurality of phase-encoded vibratory signals are frequency separated from said first plurality of phase-encoded vibratory signals by performing said actuation of (b) after said actuation of (a).

3. The method of claim 1, wherein said second plurality of phase-encoded vibratory signals are frequency separated from said first plurality of phase-encoded vibratory signals by generating each of said first plurality of phase-encoded vibratory signals in (a) with upsweeping frequencies and generating each of said second plurality of phase-encoded vibratory signals in (b) with downsweeping frequencies.

4. The method of claim 1, wherein said second plurality of phase-encoded vibratory signals are frequency separated from said first plurality of phase-encoded vibratory signals by generating said first plurality of phase-encoded vibratory signals in (a) over a first frequency range and generating said second plurality of phase-encoded vibratory signals in (b) over a second frequency range, said first frequency range being different than said second frequency range.

5. A method for generating seismic data utilizing at least two groups or systems of seismic sources where one group or system is able to emit seismic signals while another group or system continues to emit seismic signals, said method comprising:
    (a) actuating a plurality of at least three first sources associated with a first seismic system to generate a first plurality of phase-encoded vibratory signals wherein each of said first sources is out of phase with respect to other sources in said plurality of first sources;
    (b) while the first sources are generating phase-encoded signals, after said actuation of (a), actuating a plurality of at least three second sources associated with a second seismic system to generate a second plurality of phase-encoded vibratory signals and wherein each of said second sources is out of phase with respect to other sources in said plurality of second sources;
    (c) detecting said first and second plurality of phase-encoded vibratory signals from said first and second sources utilizing a first receiver positioned at a location remote from said first and second sources;
    (d) detecting said first plurality of phase-encoded vibratory signals utilizing one or more second receivers that are not contaminated by signals from the second sources; and
    (e) detecting said second plurality of phase-encoded vibratory signals utilizing one or more second receivers that are not contaminated by signals from the first sources,
    (f) recording the detected signals from the first and second sources where the signals from each source that are detected by the first receivers are separable from other sources.

6. The method of claim 5, wherein said actuation of (a) includes generating each of said first plurality of phase-encoded vibratory signals with upsweeping frequencies and said actuation of (b) includes generating each of said second plurality of phase-encoded vibratory signals with downsweeping frequencies.

7. The method of claim 5, wherein said actuation of (a) includes generating said first plurality of phase-encoded vibratory signals over a first frequency range and said actuation of (b) includes generating said second plurality of phase-encoded vibratory signals over a second frequency range, said first frequency range being different than said second frequency range.

8. A method for generating seismic data utilizing at least two groups or systems of seismic sources where one group or system is able to emit seismic signals while another group or system continues to emit seismic signals, said method comprising:

(a) actuating a plurality of at least three first sources associated with a first seismic system to generate a first plurality of phase-encoded vibratory signals each having upsweeping frequencies wherein each of said first sources is out of phase with respect to other sources in said plurality of first sources;

(b) while the first sources are generating phase-encoded signals, actuating a plurality of at least three second sources associated with a second seismic system to generate a second plurality of phase-encoded vibratory signals each having downsweeping frequencies wherein each of said second sources is out of phase with respect to other sources in said plurality of second sources;

(c) detecting said first and second plurality of phase-encoded vibratory signals utilizing one or more first receivers positioned at a location remote from said first and second sources;

(d) detecting said first phase-encoded vibratory signals utilizing one or more second receivers that are not contaminated by signals from the second sources; and (e) detecting said second phase-encoded vibratory signals utilizing one or more second receivers that are not contaminated by signals from the first sources, (f) recording the detected signals from the first and second sources where the signals from each source that are detected by the first receivers are separable from other sources based on the signals detected by the second receivers and the phase-encoding and frequency shifting revealed by the signals detected by the second receivers.

9. The method of claim 8, wherein said actuation of (a) includes generating said first plurality of phase-encoded vibratory signals over a first frequency range and said actuation of (b) includes generating said second plurality of phase-encoded vibratory signals over a second frequency range, said first frequency range being different than said second frequency range.

10. A method for generating seismic data utilizing at least two groups or systems of seismic sources where one group or system is able to emit seismic signals while another group or system continues to emit seismic signals, said method comprising:

(a) actuating a plurality of at least three first sources associated with a first seismic system to generate a first plurality of phase-encoded vibratory signals over a first frequency range wherein each of said first sources is out of phase with respect to other sources in said plurality of first sources;

(b) while the first sources are generating phase-encoded signals, actuating a plurality of at least three second sources associated with a second seismic system to generate a second plurality of phase-encoded vibratory signals over a second frequency range, said first frequency range being different than said second frequency range wherein each of said second sources is out of phase with respect to other sources in said plurality of second sources; and (c) detecting said first and second plurality of phase-encoded vibratory signals utilizing one or more first receivers positioned at a location remote from said first and second sources;

(d) detecting said first phase-encoded vibratory signals utilizing one or more second receivers that are not contaminated by signals from the second sources; and (e) detecting said second phase-encoded vibratory signals utilizing one or more second receivers that are not contaminated by signals from the first sources, (f) recording the detected signals from the first and second sources where the signals from each source that are detected by the first receivers are separable from other sources based on the signals detected by the second receivers and the phase-encoding and frequency shifting revealed by the signals detected by the second receivers.

11. An apparatus for generating seismic data utilizing at least two groups or systems of seismic sources where one group or system is able to emit seismic signals while another group or system continues to emit seismic signals, said apparatus comprising:

a first seismic system including a plurality of first sources operable to be actuated to generate a first plurality of phase-encoded sweep vibratory signals wherein each of said first sources is out of phase with respect to other sources in said plurality of first sources;

a second seismic system including plurality of second sources operable to be actuated to generate a second plurality of phase-encoded vibratory signals that are at least partially frequency separated from said first plurality of phase-encoded sweep vibratory signals generated by the first seismic system wherein each of said second sources is out of phase with respect to other sources in said plurality of second sources wherein said second seismic system is configured to be actuated while said first system is generating phase-encoded signals;

one or more first receivers positioned at a location remote from said first and second sources and operable to detect the first and second plurality of phase-encoded vibratory signals;

one or more second receivers arranged to detect the first phase-encoded vibratory signals without contamination by signals from the second sources;

one or more third receivers arranged to detect the second phase-encoded vibratory signals without contamination by signals from the first sources, and a recorder for recording the detected signals from the first, second and third sources where the signals from each source are separable from other sources based on the signals detected by the second receivers and the phase-encoding and frequency shifting revealed by the signals detected by the second receivers.

12. The apparatus of claim 11, wherein said second sources are operable to be actuated after said first sources to at least partially frequency separate said first and second plurality of phase-encoded vibratory signals.

13. The apparatus of claim 11, wherein said first sources are operable to generate each of said first plurality of phase-encoded vibratory signals with upsweeping frequencies and said second sources are operable to generate each of said second plurality of phase-encoded vibratory signals with downsweeping frequencies to at least partially frequency separate said first and second plurality of phase-encoded vibratory signals.

14. The apparatus of claim 11, wherein said first sources are operable to generate said first plurality of phase-encoded vibratory signals over a first frequency range and said second sources are operable to generate said second plurality of phase-encoded vibratory signals over a second frequency range, said first frequency range being different than said second frequency range, to at least partially frequency separate said first and second plurality of phase-encoded vibratory signals.

15. The apparatus of claim 11, further including a processing system operable to acquire data corresponding to said detected vibratory signals and separate said detected vibratory signals utilizing said acquired data.

* * * * *